United States Patent
Calder et al.

(10) Patent No.: US 11,586,594 B2
(45) Date of Patent: *Feb. 21, 2023

(54) VERSIONED AND HIERARCHICAL DATA STRUCTURES AND DISTRIBUTED TRANSACTIONS

(71) Applicant: MICROSOFT TECHNOLOGY LICENSING, LLC, Redmond, WA (US)

(72) Inventors: Bradley Gene Calder, Bellevue, WA (US); Niranjan Nilakantan, Redmond, WA (US); Shashwat Srivastav, Seattle, WA (US); Jiesheng Wu, Redmond, WA (US); Abdul Rafay Abbasi, Redmond, WA (US); Shane Mainali, Duvall, WA (US); Padmanabha Chakravarthy Uddaraju, Bellevue, WA (US); Ju Wang, Redmond, WA (US); Hemal Khatri, Redmond, WA (US); Arild Skjolsvold, Kenmore, WA (US); Harshawardhan Gadgil, Redmond, WA (US)

(73) Assignee: MICROSOFT TECHNOLOGY LICENSING, LLC, Redmond, WA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/274,018

(22) Filed: Feb. 12, 2019

(65) Prior Publication Data

US 2020/0167320 A1    May 28, 2020

Related U.S. Application Data

(63) Continuation of application No. 14/794,555, filed on Jul. 8, 2015, now Pat. No. 10,242,026, which is a
(Continued)

(51) Int. Cl.
*G06F 16/182* (2019.01)
*G06F 16/178* (2019.01)
(Continued)

(52) U.S. Cl.
CPC ...... *G06F 16/1844* (2019.01); *G06F 11/2094* (2013.01); *G06F 16/178* (2019.01);
(Continued)

(58) Field of Classification Search
CPC .. G06F 16/1844; G06F 16/27; G06F 16/1787; G06F 16/1873; G06F 16/178; G06F 16/184
See application file for complete search history.

(56) References Cited

U.S. PATENT DOCUMENTS 6,167,480 A * 12/2000 Williams ............... G06F 13/128
                                                      709/209
6,947,948 B2 * 9/2005 Wang ..................... G06F 16/284
(Continued)

*Primary Examiner* — Marc S Somers
(74) *Attorney, Agent, or Firm* — Shook, Hardy & Bacon L.L.P.

(57) ABSTRACT

Presented herein are methods of replicating versioned and hierarchical data structures, as well as data structures representing complex transactions. Due to interdependencies between data entities and a lack of guaranteed message ordering, simple replication methods employed for simple data types cannot be used. Operations on data structures exhibit dependencies between the messages making up the operations. This strategy can be extended to various types of complex transactions by considering certain messages to depend on other messages or on the existence of other entries at the data store. Regardless of origin, these dependencies can be enforced by suspending the processing of
(Continued)

messages with unsatisfied dependencies until all of its dependencies have been met. Alternately, transactions can be committed immediately, creating entities that include versioned identifiers for each of their dependencies. These entities can then be garbage collected of the parent objects are not subsequently created.

20 Claims, 6 Drawing Sheets

Related U.S. Application Data continuation of application No. 13/113,729, filed on May 23, 2011, now Pat. No. 9,098,470.

(51) Int. Cl.
*G06F 16/18* (2019.01)
*G06F 16/27* (2019.01)
*G06F 16/28* (2019.01)
*G06F 11/20* (2006.01)

(52) U.S. Cl.
CPC ........ *G06F 16/1787* (2019.01); *G06F 16/184* (2019.01); *G06F 16/1873* (2019.01); *G06F 16/27* (2019.01); *G06F 16/282* (2019.01)

(56) References Cited

U.S. PATENT DOCUMENTS

| | | | | |
|---|---|---|---|---|
| 7,702,739 | B1* | 4/2010 | Cheng | H04L 67/327 709/207 |
| 2003/0177443 | A1* | 9/2003 | Schnelle | G06F 16/86 715/227 |
| 2005/0015461 | A1* | 1/2005 | Richard | G06F 16/182 709/217 |
| 2006/0004877 | A1* | 1/2006 | Ishikawa | G06F 16/27 |
| 2006/0056413 | A1* | 3/2006 | Ikeda | G06F 9/547 370/392 |
| 2006/0143186 | A1* | 6/2006 | Whyte | G06F 9/466 |
| 2009/0313311 | A1* | 12/2009 | Hoffmann | G06F 11/2097 |
| 2010/0095268 | A1* | 4/2010 | Lowry | G06Q 10/10 707/999.1 |
| 2010/0114841 | A1* | 5/2010 | Holenstein | G06F 16/217 707/690 |

* cited by examiner

VERSIONED AND HIERARCHICAL DATA STRUCTURES AND DISTRIBUTED TRANSACTIONS

CROSS-REFERENCE TO RELATED APPLICATIONS

This application is a continuation of and claims priority from U.S. application Ser. No. 14/794,555, filed Jul. 8, 2015, entitled "Versioned and Hierarchical Data Structures and Distributed Transactions," which is a continuation of and claims priority from U.S. application Ser. No. 13/113,729, filed May 23, 2011, now U.S. Pat. No. 9,098,470, entitled "Versioned And Hierarchical Data Structures And Distributed Transactions," the entire contents of each application being herein incorporated by reference.

INTRODUCTION

It is desirable for many reasons to replicate stored data between a number of data stores. This provides redundancy in the event of disaster or failure of a primary data store. For simple data types, this can be as simple as sending a single message from a primary data center to a secondary data center. However, for more complex data types, interdependencies between data entries and a lack of guaranteed message ordering render simple replication strategies ineffective. Accordingly, methods of replicating versioned and hierarchical data structures are provided herein.

SUMMARY

Embodiments of the present invention relate to replicating versioned and hierarchical data structures in a replicated data storage system. Operations on data structures, including atomic structures representing distributed transactions and hierarchical data structures, exhibit dependencies between the messages making up the operations. For example, a child object might not be creatable before the parent object has been created. These dependencies can be enforced by using versioning for the various levels of the hierarchy such that that the different levels of the hierarchy can be independently replicated, but lower levels of the hierarchy are not visible to the client until the corresponding versions of the higher level have been committed. At other times it is important to have a consistent view committed across part of the hierarchy committing a distributed transaction. This consistent view can be provided by suspending the committing of parts of a distributed transaction until the distributed transaction has been fully replicated and ready to be committed, as well as mechanisms to coordinate the commit.

This Summary is generally provided to introduce the reader to one or more select concepts described below in the Detailed Description in a simplified form. This Summary is not intended to identify the invention or even key features, which is the purview of claims below, but is provided to be patent-related regulation requirements.

BRIEF DESCRIPTION OF THE DRAWINGS

Illustrative embodiments of the present invention are described in detail below with reference to the attached drawing figures, and wherein.

DETAILED DESCRIPTION

Figure 1:
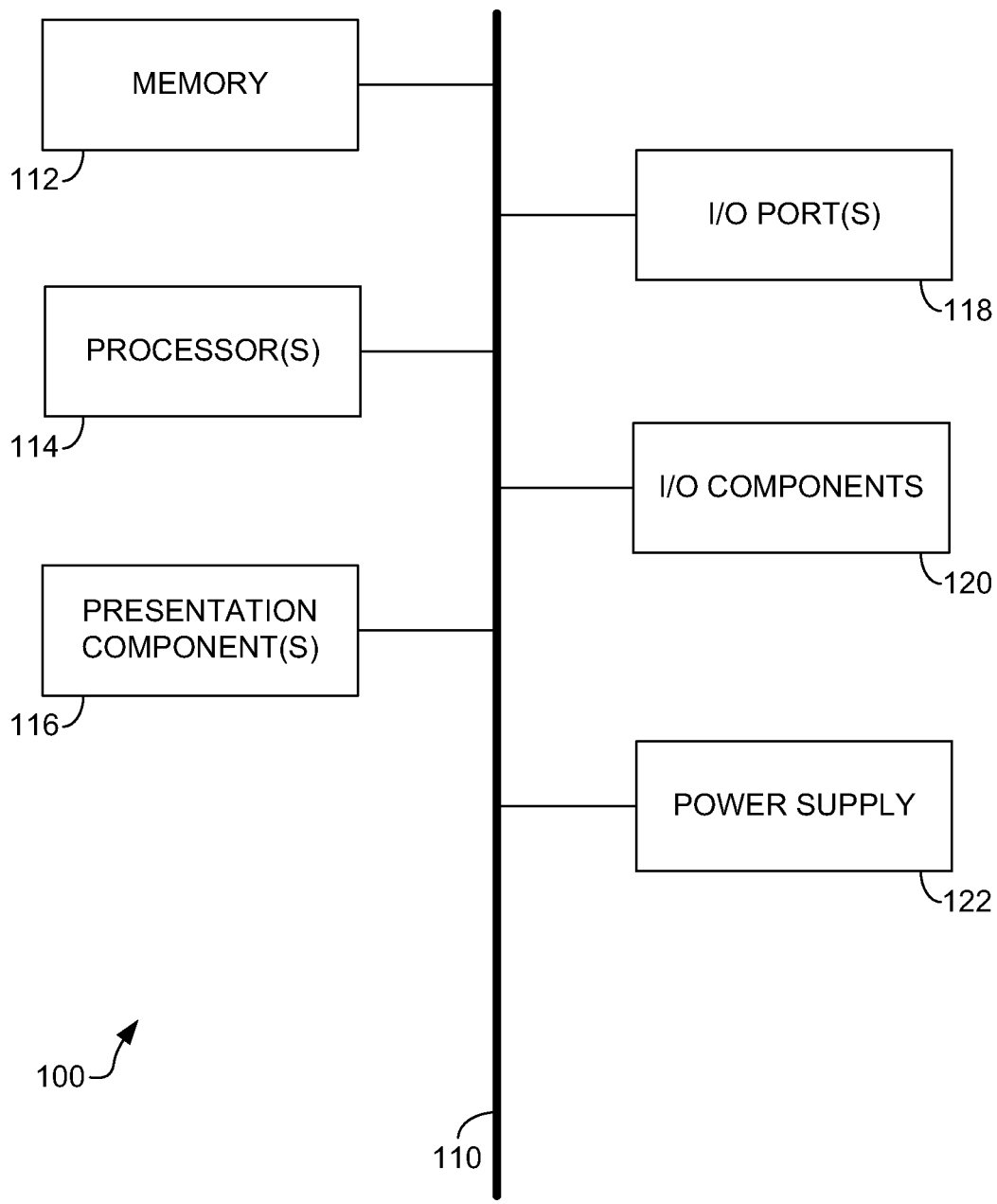
FIG. 1 depicts an exemplary computing device suitable for implementing embodiments of the present invention.

The subject matter of the present invention is described with specificity to meet statutory requirements. However, the description itself is not intended to define the scope of the claims. Rather, the inventors have contemplated that the claimed subject matter might also be embodied in other ways, to include different steps or combinations of steps similar to the ones described in this document, in conjunction with other present or future technologies. Moreover, although the term "step" may be used herein to connote different elements of methods employed, the term should not be interpreted as implying any particular order among or between various steps herein disclosed unless and except when the order of individual steps is explicitly described. Further, the present invention is described in detail below with reference to the attached drawing figures, which are incorporated in their entirety by reference herein.

Embodiments of the present invention relate to replicating versioned and hierarchical data structures and distributed transactions. In one aspect, the present invention provides one or more computer storage media having computer-executable instructions embodied thereon that, when executed, cause a computing device to perform a method of replicating hierarchical data structures. The method comprises receiving, at a secondary data store, a message from a first primary data store and determining that the first message pertains to a data object having a parent data object, which has a parent object identifier and a parent version identifier. The method further comprises determining that the parent data object with the parent object identifier and the parent version identifier is not stored at the secondary storage location and suspending the further processing of the transaction. The method also comprises receiving, at the secondary data store, a second message from a second primary data store, processing the second transaction to creating the parent data object with the parent object identifier and the parent version identifier and, after creating said parent data object, resuming the processing of the first transaction.

In another aspect, the present invention provides a computer-implemented method in a distributed computing environment utilizing a processor and memory for processing a distributed transaction in a replicated storage environment. The method comprises receiving, at a secondary data store, a plurality of messages from one or more primary data stores, each message containing a distributed transaction identifier and determining that the distributed transaction identifier in each the messages corresponds to the distributed transaction. The method further comprises receiving, at the secondary data store, a commit-distributed-transaction message, which contains the distributed transaction identifier and an indicator for the plurality of the messages. This indicator can be a count of messages, a list of transaction identifiers, or other way of knowing when all of the component transactions of the distributed transaction have been received. The method also comprises postponing the processing of the messages and the commit-distributed-transaction message and, after the commit-distributed-transaction message has been received and the indicator indicates that each of the plurality of messages corresponding to the distributed transaction has been received, using the plurality of messages to cause the distributed transaction to be atomically committed.

A third aspect of the present invention provides one or more computer storage media having computer-executable instructions embodied thereon that, when executed, cause a computing device to perform a method for processing a distributed transaction. The method comprises receiving a first object replication message including an object with an object name and object data and identifiers for one or more parent objects, each parent object identifier including a parent object name and a parent object version. The method further comprises determining a full object identifier including at least the object name, the parent object names, and the parent object versions. The method also comprises committing a transaction creating object corresponding to the full object identifier and the object data independently of whether the one or more parent objects exist and determining a live version of the object. In some embodiments, non-live versions of the object are then garbage collected.

Having briefly described an overview of embodiments of the present invention, an exemplary operating environment suitable for implementing embodiments hereof is described below.

Referring to the drawings in general, and initially to FIG. 1 in particular, an exemplary operating environment suitable for implementing embodiments of the present invention is shown and designated generally as computing device 100. Computing device 100 is but one example of a suitable computing environment and is not intended to suggest any limitation as to the scope of use or functionality of the invention. Neither should the computing environment 100 be interpreted as having any dependency or requirement relating to any one or combination of modules/components illustrated.

Embodiments may be described in the general context of computer code or machine-useable instructions, including computer-executable instructions such as program modules, being executed by a computer or other machine, such as a personal data assistant or other handheld device. Generally, program modules including routines, programs, objects, modules, data structures, and the like, refer to code that performs particular tasks or implements particular abstract data types. Embodiments may be practiced in a variety of system configurations, including hand-held devices, consumer electronics, general-purpose computers, specialty computing devices, etc. Embodiments may also be practiced in distributed computing environments where tasks are performed by remote-processing devices that are linked through a communications network.

With continued reference to FIG. 1, computing device 100 includes a bus 110 that directly or indirectly couples the following devices: memory 112, one or more processors 114, one or more presentation modules 116, input/output (I/O) ports 118, I/O modules 120, and an illustrative power supply 122. Bus 110 represents what may be one or more busses (such as an address bus, data bus, or combination thereof). Although the various blocks of FIG. 1 are shown with lines for the sake of clarity, in reality, delineating various modules is not so clear, and metaphorically, the lines would more accurately be grey and fuzzy. For example, one may consider a presentation module such as a display device to be an I/O module. Also, processors have memory. The inventors hereof recognize that such is the nature of the art, and reiterate that the diagram of FIG. 1 is merely illustrative of an exemplary computing device that can be used in connection with one or more embodiments. Distinction is not made between such categories as "workstation," "server," "laptop," "hand-held device," etc., as all are contemplated within the scope of FIG. 1 and reference to "computer" or "computing device."

Computing device 100 typically includes a variety of computer-readable media. By way of example, and not limitation, computer-readable media may comprise the following exemplary non-transitory media: Random Access Memory (RAM); Read Only Memory (ROM); Electronically Erasable Programmable Read Only Memory (EEPROM); flash memory or other memory technologies; CDROM, digital versatile disks (DVD) or other optical or holographic media; magnetic cassettes, magnetic tape, magnetic disk storage or other magnetic storage devices, or any other medium that can be used to encode desired information and be accessed by computing device 100.

Memory 112 includes computer-storage media in the form of volatile and/or nonvolatile memory. The memory may be removable, non-removable, or a combination thereof. Exemplary hardware devices include solid-state memory, hard drives, optical-disc drives, etc. Computing device 100 includes one or more processors that read data from various entities such as memory 112 or I/O modules 120. Presentation module(s) 116 present data indications to a user or other device. Exemplary presentation modules include a display device, speaker, printing module, vibrating module, and the like. I/O ports 118 allow computing device 100 to be logically coupled to other devices including I/O modules 120, some of which may be built in. Illustrative modules include a microphone, joystick, game pad, satellite dish, scanner, printer, wireless device, and the like.

Figure 2A:
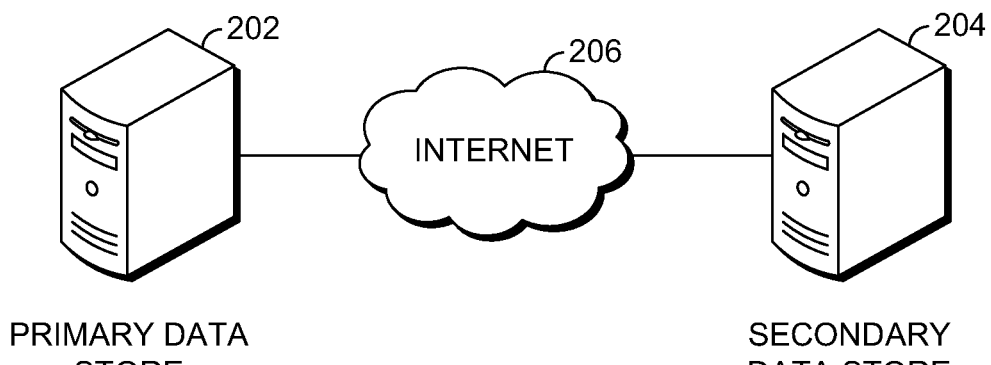
FIG. 2A depicts a simple environment suitable for implementing embodiments of the present invention.

Turning now to FIG. 2A, a simple environment suitable for practicing a method of replicating versioned and hierarchical data structures is presented in accordance with an embodiment of the present invention. A primary data store 202 maintains an authoritative version of the data to be replicated. Secondary data store 204 maintains a replicated copy of the data stored at primary data store 202. Each data store component shown in FIG. 2 may be any type of computing device, such as computing device 100 described with reference to FIG. 1, for example. Primary data store 202 and secondary data store 204 communicate in the illustrated embodiments via Internet 206. In other embodiments, primary data store 202 and secondary data store 204 communicate via a local area network, or are co-located on the same computer and communicate via inter-process communication.

Figure 2B:
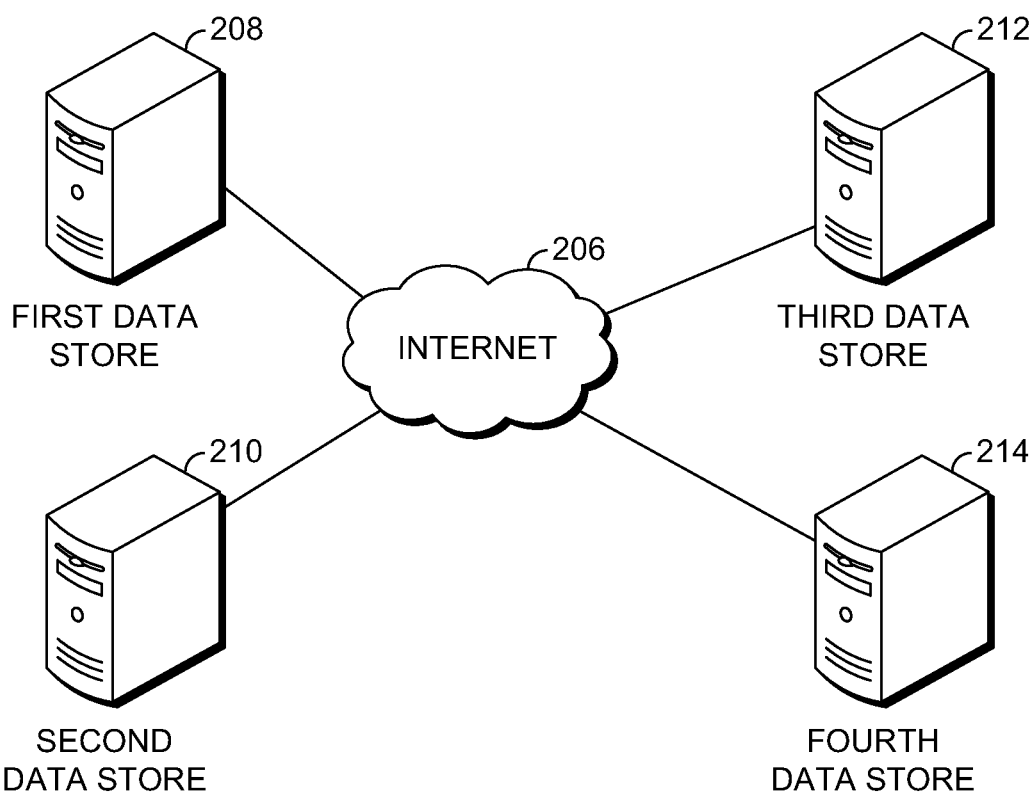
FIG. 2B depicts a more complex environment suitable for implementing embodiments of the present invention.

Turning now to FIG. 2B, a more complex environment suitable for practicing a method of replicating versioned and hierarchical data structures is presented. Four data stores, a first data store 208, a second data store 210, a third data store 212, and a fourth data store 214 are depicted. In the environment as shown, no data store is explicitly a primary data store or a secondary data store, per se, but rather each data store acts as a primary data store or secondary data store with respect to certain data. As an illustrative example, with regards to certain data, the first data store 208 acts as a primary data store, while the second data store 210 acts as a secondary data store and the third and fourth data stores 212 and 214 do not store the data at all. In an alternative example, the fourth data store 214 acts as a primary data store, while both the second and third data stores 210 and 212 act as secondary data stores. Note that a data store may act as a primary data store for certain data, a secondary data store for other data, and not store still other data at all. As in FIG. 2A, the data stores are depicted as communicating via Internet 206, though other methods of communication are envisioned.

It should be noted that, although the environment in which many embodiments will be practiced will more closely resemble FIG. 2B than FIG. 2A, those embodiments will be discussed herein in the context of FIG. 2A for the purposes of simplicity. It will be apparent to one skilled in the art how such discussion can be applied in the context of more complex environments such as FIG. 2B.

Figure 3:
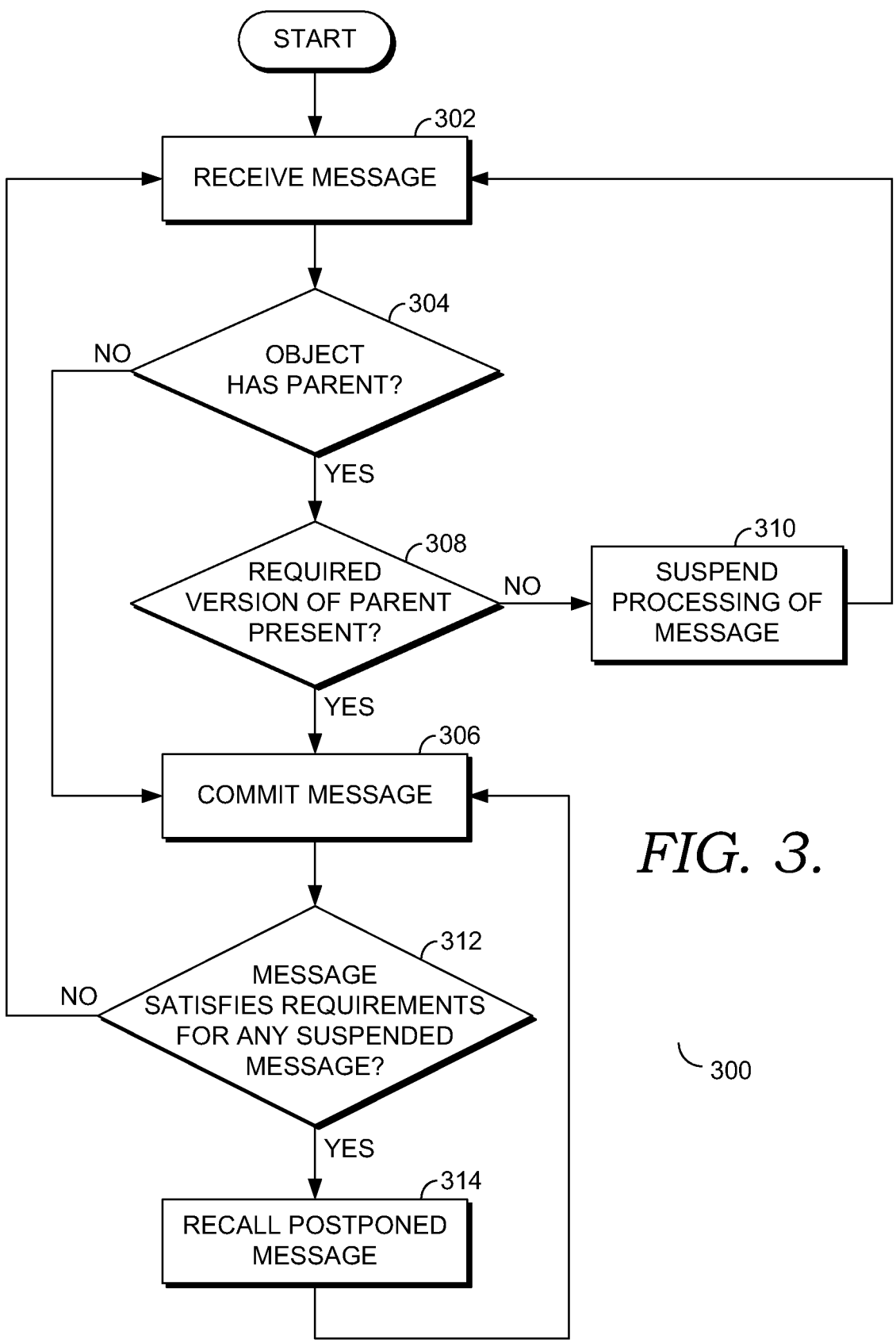
FIG. 3 depicts a flowchart diagram for a method of replicating versioned and hierarchical data structures in accordance with an embodiment of the present invention.

Turning now to FIG. 3, a flowchart diagram for a method 300 of replicating versioned and hierarchical data structures in accordance with an embodiment of the present invention is presented. At a step 302 a message from a primary data store is received at a secondary data store, the message pertaining to a data object. If the data object is part of a hierarchy of data objects, it may have a parent data object. Any hierarchical relationship is determined at a step 304. For a further discussion of hierarchical data structures, see FIG. 4 and the accompanying discussion. If the object is not a part of a hierarchy of data objects, or if it is a part of such a hierarchy but has no parent data object, processing proceeds to a step 306, wherein the message is committed. If the object does have a parent data object, it is checked at a step 308 whether this parent data object is present at the secondary data store. This check can fail in two ways: first, the parent object may not be present; second, the parent data object may be present, but may not meet a required version.

To see how the latter situation can arise, consider an illustrative example where a parent data object with a given identifier contains one or more child data objects. In this case, a message deleting the parent data object may also require the deletion of all child data objects it contains. In this example, three messages are sent: a first message that deletes the parent data object, a second message that creates a new parent data object with the same identifier, and a third message that adds a child data object to the newly created parent data object. Since the ordering of child messages is not guaranteed with respect to the parent messages, the third message could be received before the first data message. In the absence of versioning, the child data object would be added to the original parent object before it is deleted, and then deleted along with the parent data object. Thus, the net result of the three messages is, in this example, an empty new parent object.

By contrast, when versioning is used, if the third message is received first, it may indicate that it requires the later version of the parent data object, as created by the second message. Processing can thus be suspended (as described below) until the first two messages have been received and processed, resulting in a new parent object containing the new child object, as intended. Thus, if the parent object is not present (e.g. if the third message is received between the first and second messages in the preceding example), or if the parent object is present but not of the required version at step 308, processing of the received message is suspended at a step 310. Following step 310, the methodology returns to the step 302 to await further messages, which may allow the suspended message to be further processed. Note that the messages required to allow processing of the suspended message may come from the same primary data store as the suspended message, or they may come from a different primary data store.

If the required version of the parent object is present, the exemplary methodology proceeds to step 306, where the transaction contained in the message is committed. Committing a transaction may create an object that is a parent object for a suspended message, update a parent object to a required version, or otherwise satisfy a prerequisite of a suspended data message. Accordingly, at a step 312, it is determined if any currently suspended messages can now be processed. If not, the algorithm returns to step 302 to await further messages. If prerequisites for a suspended message have been met, than that message is recalled at step 314, which allows processing to return to the step 306 and the transaction contained in the newly recalled message is committed in turn. As previously discussed, this may create an object that is a parent object for another suspended message, update a parent object to a required version, or otherwise satisfy the prerequisites of another suspended data message. Accordingly, the step 312 again checks for additional messages that can now be processed. In this fashion, a receiving single message can enable a large number of transactions to be committed.

It should also be noted that, in some embodiments, certain data objects may require multiple messages to be created. In one exemplary embodiment, certain very large data objects may require multiple messages to transmit from the primary data store to the secondary data store. For example, blob objects can be too large to transmit in a single message. In another exemplary embodiment, creating a data object may be a multi-step process. In this case, once all of the prerequisites of a data object are satisfied, all of the transactions pertaining to that data object are committed atomically. For more detail regarding atomic commits, see FIG. 5.

Figure 4A:
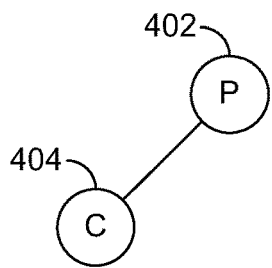
FIGS. 4A-4D depicts several illustrative examples of hierarchical data structures suitable for replication by embodiments of the present invention.
Figure 4B:
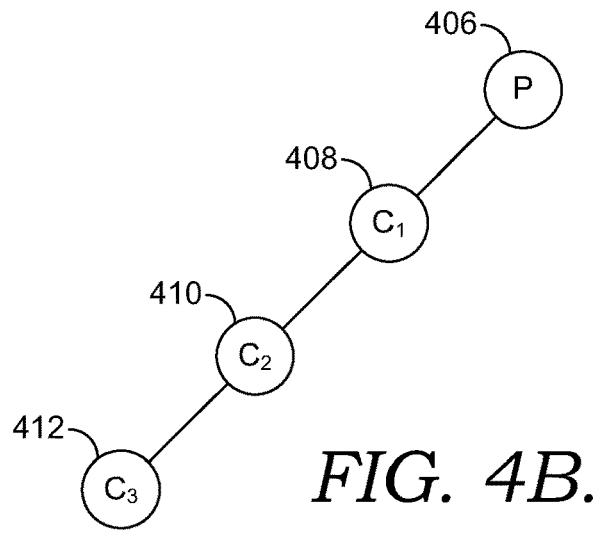

Turning now to FIGS. 4A-4D, several illustrative examples of hierarchical data structures are depicted suitable for replication by embodiments of the present invention. FIG. 4A presents a simple hierarchical data relationship. A parent data object 402, "P," has a single child data object 404, "C". In one example, the parent data object is a blob container and the child data object is a blob object. As another example, the parent data object could be a table, and the child data object could be an entity associated with the table. For the sake of generality, the terms "parent" and "child" are used, but some embodiments of hierarchical data structures represent a data types, not conventionally thought of in parent/child terms. For example, the parent data object may be a message queue, and the child data object may be a message object associated with that queue. In an exemplary embodiment, a "blob" represents the basic storage object to be replicated, such as the file in a file system, and a "blob container" represents a logical grouping of blobs, much like the directory in a file system. For structured storage, "tables" can be used that store "rows." Additional data structures include "queues" that are used for delivering "messages," which can be put into and retrieved from the queues. FIG. 4B presents a multi-level hierarchy. Here, a parent data object 406, "P," has a child data object 408, "$C_1$." However, data object 408 is itself the parent data object to a child data object 410, "C2," which is in turn the parent of a child data object 412, "C3." Thus, for the illustrated data hierarchy in this embodiment, the depicted data objects must be created strictly in the order P, followed by C1 then C2 and then C3. A data object which has no parent data object is sometimes called a "root object." In some embodiments, a data structure can have multiple root objects, resulting in a disconnected data structure. A data object which is the parent of given data object, or the parent of the parent of the given object, etc., is said to be an "ancestor" of the given object, and the ancestors of an object are said to be "above" it in the data hierarchy. Thus, in the example depicted in FIG. 4B, the ancestors of data object 412, "C3" are the data objects 410 ("C2"), 408 ("C1"), and 406 ("P"). A data object is said to be "below" its ancestors in the data hierarchy. Thus, the data object 412 ("C3") is below the data objects 410 ("C2"), 408 ("C1"), and 406 ("P").

Figure 4C:
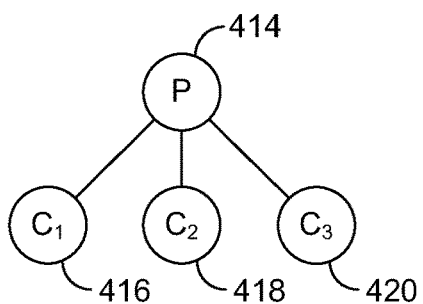
Figure 4D:
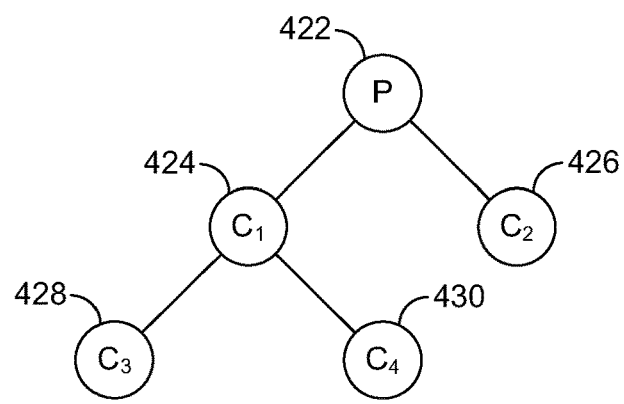

By contrast, FIG. 4C depicts a different data hierarchy for P, C1, C2 and C3. Here, parent data object 414 is the direct parent for data objects 416, 418 and 420. Thus, for this data structure, P must be created first, but once it has been created, C1, C2 and C3 can be created in any order. Hence, in one embodiment, a data structure depicted in FIG. 4B could be employed for storing files in a hierarchical directory namespace, where the hierarchy represents the directories created in the namespace, while a data structure such as FIG. 4C could be used to store a message set, where the order of the messages is not significant. Other permutations are also possible, as shown in FIG. 4D. There, parent data object 422, "P," has two child data objects, 424 ("C1") and 426 ("C2"). Data object 424, C1, is in turn the parent data object for two child data objects, 428 ("C3") and 430 ("C4"). Note also that data object 428 ("C3") is neither an ancestor of, nor below, data object 426 ("C4"). Such data objects are said to be "incomparable." The permissible orders of object creation for the hierarchical data structures such as FIG. 4D are more complicated to determine than simpler data structures such as FIGS. 4A-4C, but can be determined by techniques such as a topological sort.

Figure 5:
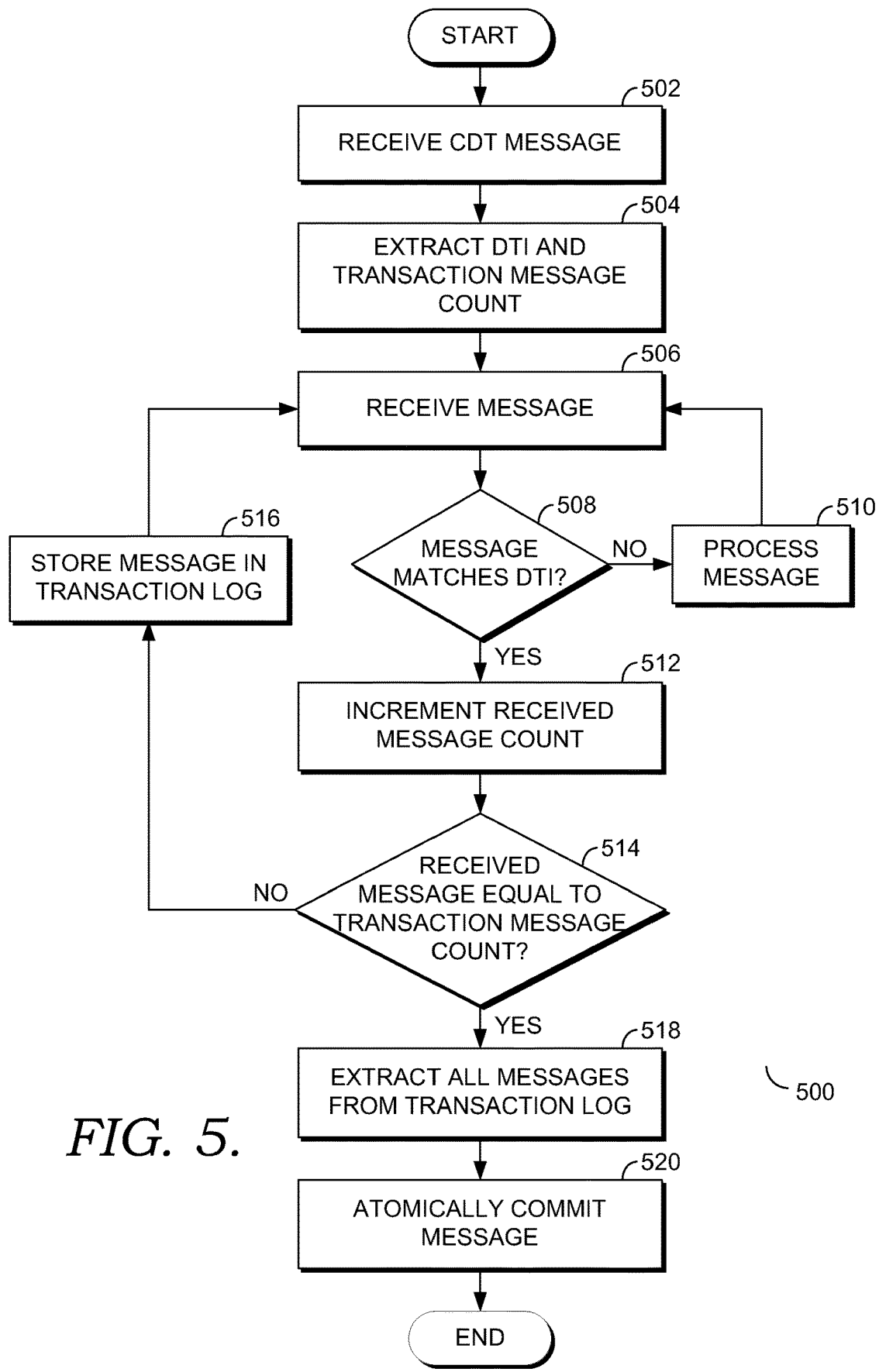
FIG. 5 depicts a flowchart diagram for a method for processing a distributed transaction in a replicated storage environment in accordance with an embodiment of the present invention.

Turning now to FIG. 5, a flowchart diagram depicting a method 500 for processing a distributed transaction in a replicated storage environment according to one embodiment of the present invention is presented. Initially, at a step 502, a commit-distributed-transaction (CDT) message is received at a secondary data store from a primary data store. This CDT message will, in many embodiments, contain a distributed transaction identifier (DTI) and a transaction message count. The DTI serves to link together all of the messages making up the distributed transaction, and the transaction message count indicated the total number of messages making up the distributed message. In other embodiments, instead of a transaction message count, the individual transaction identifiers of each transaction making up the distributed transaction are included instead. At a step 504, the DTI and information identifying the transaction messages, which can be a count or a set of transaction identifiers, are extracted from the CDT message. In one embodiment, this causes a distributed transaction log associated with the DTI to be created. Next at a step 506, another message is received at the secondary data store. This message may be from the same primary data store as the CDT message, or it may be from another primary data store. In one embodiment, it may be received from another secondary data store. Similarly, the component messages making up the distributed transaction may all originate from the same primary data store, or they may originate from many primary data stores. Next, at a step 508, the received message is examined to see if it contains a DTI and if that DTI matches the DTI received in the CDT message. Although, in this illustrative example, only a single distributed transaction is shown as being processed, in some embodiments of the invention, many distributed transactions could be underway simultaneously. Thus, a message containing a CDT may be processed as part of the appropriate distributed transaction.

If the message does not contain a DTI, or if the DTI does not match the DTI contained in the CDT message, the message is processed by other means (which may include being processed as part of the appropriate distributed transaction) at a step 510. If the message does contain a matching DTI, a received message count associated with the distributed transaction is incremented at a step 512. Though the embodiment shown uses a message count, a corresponding step of marking a transaction identifier as received may be substituted in those embodiments that send a set of transaction identifiers instead of a message count. At a step 514, the received message count is compared to the transaction message count contained in the CDT message. If the received message count is less than the transaction message count (or if the CDT message has not yet been received; see below), the message is stored in a transaction message log at a step 516. In one embodiment, the transaction message log is associated with the DTI. In another embodiment, a single transaction log is shared between all distributed transactions. In yet another embodiment, a single message log is shared between all messages that cannot be yet processed for any reason. In another embodiment, the transaction is stored in a global message log, waiting for the Distributed Transaction Engine (DTE) to cause its transaction to be committed. In still another embodiment, the transaction is stored in a local message log and is identifier is registered with a global distributed transaction table, which is polled to determine when the transaction can be committed.

Although the CDT message is received first in the described embodiment, this will not always be the case. In many embodiments, the CDT message will only be sent after all of the messages making up the distributed transaction have been sent, and will therefore be received last. Embodiments in which the CDT is received first, last, or among the component messages of the transaction all fall within the scope of the invention.

Once the received message count is determined to be equal to the transaction message count at step 514, indicating that all of the messages making up the distributed transaction and the CDT message have been received, the distributed transaction can be committed. This process begins at a step 516, wherein all of the messages pertaining to the distributed transaction are extracted from the transaction logs. In some embodiments, the messages may need to be ordered appropriately at this point. In other embodiments, the messages are maintained in the transaction log in the order in which their transactions are to be committed. In yet other embodiments, the order in which the transactions are committed is unimportant. Next, at a step 518, the distributed transaction is committed atomically on the secondary data store. In some embodiments, this is accomplished using two-phase commit or some other local protocol that provides fast atomic committing within a data store. Some embodiments may relax the requirement for atomic commit of certain distributed transactions. This allows the atomic committing of a distributed transaction to occur completely within a primary data store, and then after all of the changes are replicated to the secondary data store, the distributed transaction to be atomically committed in the secondary data store. This allows the primary and secondary data stores to be decoupled and allows the distributed transaction to be asynchronously committed on the secondary.

When committing a distributed transaction atomically, any access of the data store must show either all of the component transactions committed or none of them committed. A data store may allow multiple entities to be updated within a single atomic transaction. As an illustrative example consider a shopping cart application, where the distributed transaction specifies that a first item (entity) is added to the cart, a second item is added to the cart, and a third entity which represents the total price of objects in the cart is updated at the same time. The distributed transaction represents atomically committing these 3 transactions. The CDT message then contains the count or transaction IDs for each of these entities along with the distributed transaction identifier. As each of the entities is processed, it is determined that they are part of distributed transaction and they are registered with the distributed transaction engine (DTE) together with their individual transaction identifier and the DTI. Once all three transactions have been registered with the DTE, the DTE is responsible for performing the atomic commit and any rollback of the distributed transaction if need be.

A move operation that changes the location of a data structure can similarly be performed atomically. Similarly, for a distributed transaction such as a copy operation, which creates a second, substantially identical data structure in a different location or with a different name, either all of the copied structure should be visible, or none of it should be. For example, if a large data object is being copied, requiring many messages, there should never be a state when only a portion of the object is visible at the data store.

Figure 6:
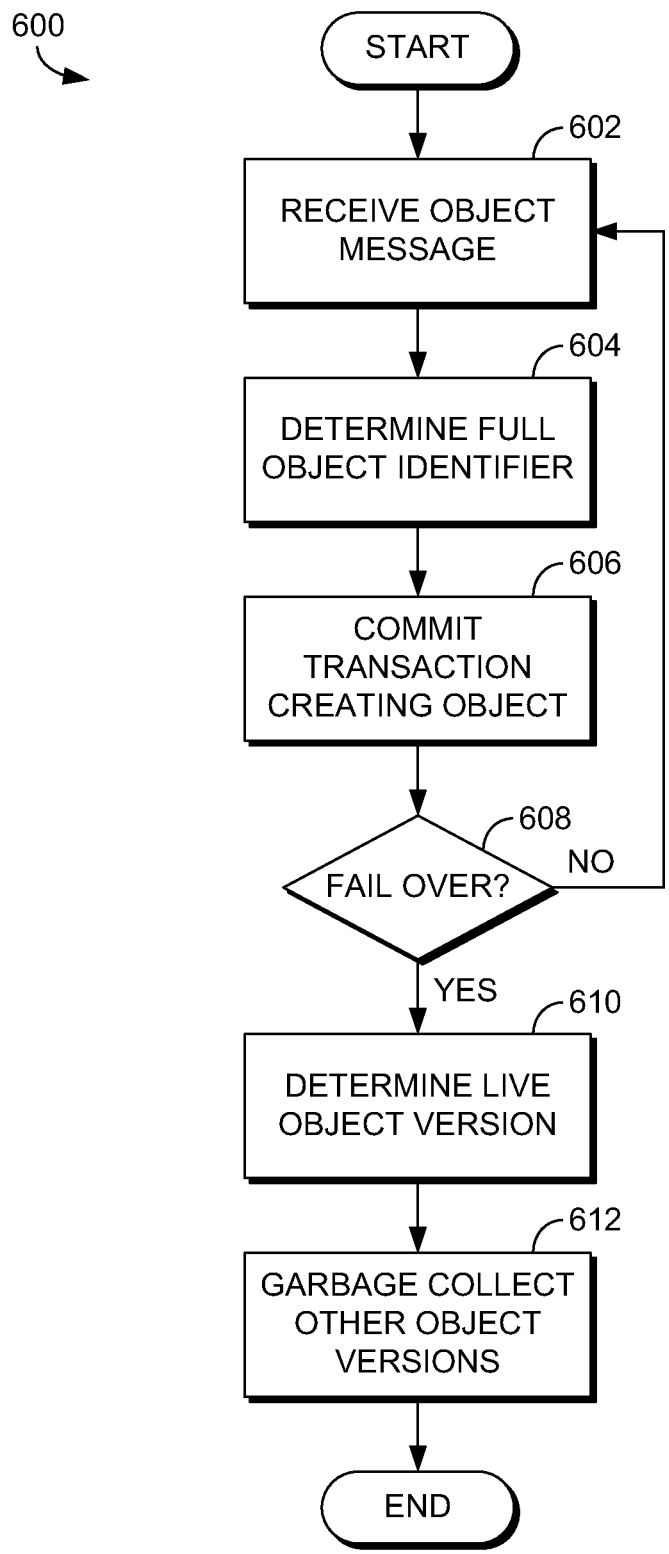
FIG. 6 depicts a flowchart diagram for a method of using versioned data structures to process distributed transactions in a replicated storage environment in accordance with an embodiment of the present invention.

Turning now to FIG. 6, a flowchart diagram for a method of using versioned data structures to process distributed transactions in a replicated storage environment in accordance with an embodiment of the present invention, the method generally referred to by the reference numeral 600. This method is suitable, for example, for execution by a secondary data store in the replicated storage environment. At a step 602, a message containing a transaction having the effect of creating an object is received. As described above with reference to certain other embodiments, the object exists within a hierarchy of other objects. As an example, at the root of the hierarchy, there may be an account name. Under the account name, one or more container objects may exist, and each of these container objects may contain leaf objects or other container objects. Any or all of these objects within the hierarchy may be versioned. A portion of an exemplary hierarchy might contain three layers: (1) an account name and version for the account, (2) a container name and version for the container, and (3) a blob name. Each object in the hierarchy can be uniquely identified by a full object identifier constructed by concatenating the names and versions of all parent objects with the name (and, in some embodiments, the version) of the object. Thus the blob above could be uniquely identified by the identifier (accountName+accountVersion)+(ContainerName+containerVersion)+BlobName. This has the advantage of allowing each of the different levels of the hierarchy to be independently replicated and committed at a secondary data store, as described below.

At a step 604, the full object identifier for the object to be created is determined. In some embodiments, this full object identifier is included in the message received at step 602; in other, it is constructed from information contained in that message. Because the full object identifier contains the identifiers of all of its parents in the hierarchy, this can be done without first checking to see if the correct versions of the parents have previously been created. Thus, at a step 606, the transaction creating the object is committed. These steps may be repeated many times for different objects at different levels of the hierarchy. At a step 608, when it is determined that a failover has occurred, the secondary data store must be prepared to present a consistent view of the hierarchy, which requires determining a live version of an object to be retrieved. This is shown as occurring at a step 610, after the determination of a failover has occurred, but in other embodiments, it can be done continuously or periodically after failover. The live version of an object (at any level of the hierarchy) is the most current, consistent version of the object; i.e. it is the one that should be returned if a user requests the object. It is determined by finding the most recent version of the object such that all of the ancestors of the object within the hierarchy are live. This ensures that an object can only be accessed (such as on a failover to the secondary or in a read-only mode at the secondary) if all of the parent objects have also been replayed and committed and are still live on the secondary. If, after failover, a parent in the objects hierarchy does not exist, then the object is garbage collected. This is shown at a step 612, but (as with the step 610) can be done continuously or periodically before failover as well for older versions of the object than the currently live version. In some embodiments of this garbage collection process, objects or versions of objects that are non-live or unreferenced are located in the data store and deleted or the storage they occupy is otherwise returned to available use. In other embodiments, clients are allowed to read from the secondary during normal operation (before failover), and the live version of the object is the most recent version of the object such that all of the ancestors of the object within the hierarchy are live.

An as example, consider a simple three-level hierarchy, with accounts which store containers which store blobs. The accounts, containers, and blobs are stored in their own are stored separately and they geo-replicate completely independently of one another. The method 600 also allows them to commit independently of each other at the secondary data store, since each object has the full identifier of all of its parents in the hierarchy. Consider the scenario of creating a container in the storage account and putting blobs into it. When this occurs, the container is created with a first version on the primary data store, and that creation is replicated to the secondary data store for the account. Similarly, when blobs are put into that container, those blobs are stored at the primary data store and also replicated to the secondary data store. All of the blobs are stored with the container name and version as part of their identifiers. Note that since blobs and containers are replicated independently the blobs may replicate before the container creation does. This means if a hard/abrupt failover to the secondary data store occurs due to a disaster at the primary data store, the container may never be replicated to the secondary data store, even though the blobs have been replicated and created on the secondary. This is not problematic, because the blobs will not be live, since the container was not created. A garbage collection process will clean up those orphaned blobs.

In a second scenario, a container with a given name is created, populated with blobs, and deleted repeatedly. We assume that in the embodiment being described, a delete of the container specifies that all blobs belonging to that container version should also be deleted. Since the container transactions are replicated and committed completely independently of the blob transactions, if a hard/abrupt failover to the secondary data store occurs, the version of the container that is the current live one on the secondary could be any recent version, and where the blobs are in their replication process is completely independent from the containers. After the failover, either the container will be live with some version, or it will be in its deleted state. If it is live with a given container version, then only blobs with that container version will be live, and the rest will be garbage collected. If, on the other hand, the container is in the deleted state, then all of the blobs will be garbage collected, since no version of the container is live.

Alternative embodiments and implementations of the present invention will become apparent to those skilled in the art to which it pertains upon review of the specification, including the drawing figures. Accordingly, the scope of the present invention is defined by the claims that appear in the "claims" section of this document, rather than the foregoing description.

The invention claimed is:

1. A computer-implemented method in a distributed computing environment utilizing a processor and memory for processing transactions in a replicated storage environment, the method comprising:
   receiving a first object replication message at a secondary data store associated with one or more primary data stores, the first object replication message comprising:
   (1) an object comprising an object name; and
   (2) identifiers for one or more parent objects, each parent object identifier comprising a parent object name and a parent object version;
   determining a full object identifier, the full object identifier including at least the object name, parent object names, and parent object versions, wherein the full object identifier supports both independently replicating parent objects and objects at different levels of hierarchy from the one or more primary stores to the secondary data store and subsequently accessing live versions of the objects;
   committing a transaction creating the object corresponding to the full object identifier independently of whether the one or more parent objects exist;
   accessing the full object identifier including at least the object name, the parent object names, and the parent object versions to determine a live version of the object at the secondary data store;
   based on accessing the full object identifier, determining the live version of the object, wherein the live version is determined to be live based on determining that each of one or more parent objects of the live version of the object identified from the one or more parent objects of the full object identifier are live at the secondary data store; and
   communicating the live version of the object.

2. The computer-implemented method of claim 1, wherein an identified version of the object is determined to be an identified live version of the object based on at least the following criteria being satisfied:
   the identified version of the object exists at the secondary data store;
   for each parent object of the one or more parent objects, a version of the parent object corresponding to the parent object version exists at the secondary data store; and
   the identified version of the object is a most recent version of the object at the secondary data store that satisfies the first two criteria.

3. The computer-implemented method of claim 1, further comprising:
   determining that one or more versions of the object at the secondary data store are not live; and
   based on the determining, garbage collecting the one or more versions of the object determined not to be live.

4. The computer-implemented method of claim 1, wherein the full object identifier is included in an object replication message.

5. The computer-implemented method of claim 1, wherein the full object identifier comprises identifiers of all parent objects of the object.

6. The computer-implemented method of claim 1, wherein each of the one or more parent objects is a container object and the object is stored in the container object.

7. The computer-implemented method of claim 1, wherein committing the transaction creating the object corresponding to the full object identifier independently of whether the one or more parent objects exist is performed at the secondary data store associated with the one or more primary data stores storing the one or more parent objects.

8. The computer-implemented method of claim 1, wherein determining the live version is performed in response to a failover operation.

9. A computer-implemented system in a distributed computing environment, the computer-implemented system comprising a processor and memory configured to perform a method for processing transactions in a replicated storage environment, the method comprising:
   receiving a first object replication message at a secondary data store associated with one or more primary data stores, the first object replication message comprising:
   (1) an object comprising an object name; and
   (2) identifiers for one or more parent objects, each parent object identifier comprising a parent object name and a parent object version;
   determining a full object identifier, the full object identifier including at least the object name, parent object names, and parent object versions wherein the full object identifier supports both independently replicating parent objects and objects at different levels of hierarchy from the one or more primary stores to the secondary data store and subsequently accessing live versions of the objects;
   committing a transaction creating the object corresponding to the full object identifier independently of whether the one or more parent objects exist;
   accessing the full object identifier including at least the object name, the parent object names, and the parent object versions to determine a live version of the object at the secondary data store;
   based on accessing the full object identifier, determining the live version of the object, wherein the live version is determined to be live based on determining that each of one or more parent objects of the live version of the object identified from the one or more parent objects of the full object identifier are live at the secondary data store
   communicating the live version of the object.

10. The computer-implemented system of claim 9, wherein an identified version of the object is determined to be an identified live version of the object based on at least the following criteria being satisfied:
    the identified version of the object exists at the secondary data store;
    for each parent object of the one or more parent objects, a version of the parent object corresponding to the parent object version exists at the secondary data store; and the version of the object is a most recent version of the object at the secondary data store that satisfies the first two criteria.

11. The computer-implemented system of claim 9, further comprising:
    determining that one or more versions of the object at the secondary data store are not live; and
    based on the determining, garbage collecting the one or more versions of the object determined not to be live.

12. The computer-implemented system of claim 9, wherein the full object identifier is included in an object replication message.

13. The computer-implemented system of claim 9, wherein the full object identifier comprises identifiers of all parent objects of the object.

14. The computer-implemented system of claim 9, wherein each of the one or more parent objects is a container object and the object is stored in the container object.

15. One or more computer storage media having computer-executable instructions embodied thereon that, when executed, cause a computing device to perform a method for processing transactions in a replicated storage environment, the method comprising:
    receiving a first object replication message at a secondary data store associated with one or more primary data stores, the first object replication message comprising:
        (1) an object comprising an object name; and
        (2) identifiers for one or more parent objects, each parent object identifier comprising a parent object name and a parent object version;
    determining a full object identifier, the full object identifier including at least the object name, parent object names, and parent object versions, wherein the full object identifier supports both independently replicating parent objects and objects at different levels of hierarchy from the one or more primary stores to the secondary data store and subsequently accessing live versions of the objects;
    committing a transaction creating the object corresponding to the full object identifier independently of whether the one or more parent objects exist;
    accessing the full object identifier including at least the object name, the parent object names, and the parent object versions to determine a live version of the object at the secondary data store;
    based on accessing the full object identifier, determining the live version of the object, wherein the live version is determined to be live based on determining that each of the one or more parent objects of the live version of the object identified from the one or more parent objects of the full object identifier are live at the secondary data store; and
    communicating the live version of the object.

16. The computer-implemented method of claim 15, wherein an identified version of the object is determined to be an identified live version of the object based on at least the following criteria being satisfied:
    the identified version of the object exists at the secondary data store;
    for each parent object of the one or more parent objects, a version of the parent object corresponding to the parent object version exists at the secondary data store; and
    the identified version of the object is a most recent version of the object at the secondary data store that satisfies the first two criteria.

17. The computer-implemented method of claim 15, further comprising:
    determining that one or more versions of the object at the secondary data store are not live; and
    based on the determining, garbage collecting the one or more versions of the object determined not to be live.

18. The computer-implemented method of claim 15, wherein the full object identifier is included in an object replication message.

19. The computer-implemented method of claim 15, wherein the full object identifier comprises identifiers of all parent objects of the object.

20. The computer-implemented method of claim 15, wherein each of the one or more parent objects is a container object and the object is stored in the container object.

* * * * *